United States Patent [19]

Farrell

[11] 4,256,447
[45] Mar. 17, 1981

[54] INJECTION MOLDING MACHINE WITH REGENERATIVE FEED SYSTEM

[75] Inventor: Robert E. Farrell, Springfield, Mass.

[73] Assignee: Package Machinery Company, East Longmeadow, Mass.

[21] Appl. No.: 948,082

[22] Filed: Oct. 2, 1978

[51] Int. Cl.³ .......................... B29F 1/04; B29F 1/06
[52] U.S. Cl. ....................................... 425/159; 425/166
[58] Field of Search ............................... 425/159, 166

[56] References Cited

U.S. PATENT DOCUMENTS

| | | | |
|---|---|---|---|
| 3,001,233 | 9/1961 | Ernst | 425/166 X |
| 3,741,700 | 6/1973 | Hutchinson | 425/159 |
| 4,040,776 | 8/1977 | Kolz | 425/166 X |

FOREIGN PATENT DOCUMENTS 1529751  3/1969  Fed. Rep. of Germany .

OTHER PUBLICATIONS

Ölhydraulik in Theorie und Anwendung, 2nd ed., 1968, pp. 106–109 and pp. 252–263.

Primary Examiner—Thomas P. Pavelko
Attorney, Agent, or Firm—McCormick, Paulding & Huber

[57] ABSTRACT

An injection molding machine having a ram for injecting a settable material into an associated mold includes a hydraulic actuator formed by a piston and cylinder assembly which displaces the ram during the injection operation. The piston is an unbalanced area piston which permits the ram to be displaced in both a regenerative and a nonregenerative feed mode. Fluid controls for operating the piston and cylinder assembly include a regeneration valve in fluid communication through the cylinder with opposite sides of the unbalanced piston to permit regenerative feed of the piston and ram in one valve position or to permit nonregenerative feed in another valve position. Displacing the ram in the regenerative or nonregenerative modes of operation allows the mold to be filled at different rates or pressures.

7 Claims, 1 Drawing Figure

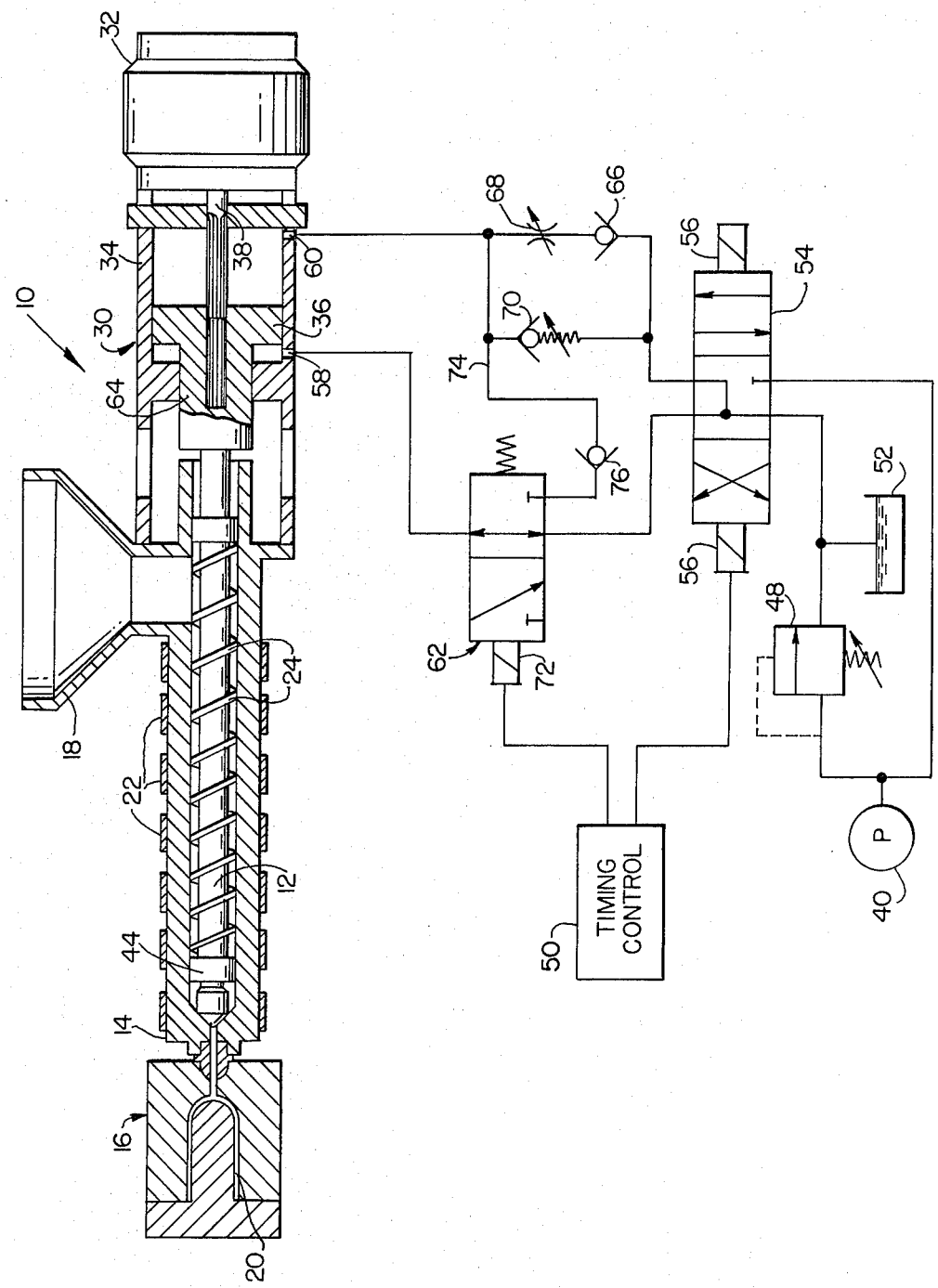

INJECTION MOLDING MACHINE WITH REGENERATIVE FEED SYSTEM

BACKGROUND OF THE INVENTION

The present invention relates to an injection molding machine in which a charging ram injects a settable material into the cavity of an associated mold. More particularly, the invention is concerned with a regenerative feed system which displaces the ram during the injection operation.

In prior art injection molding machines such as shown in U.S. Pat. Nos. 2,786,234 and 3,509,600, certain parameters of an injection molding process are controlled and modulated to carry out the molding process in a particular manner. For example, in a molding machine having a screw feeder or ram that is rotated within a barrel to develop a charge of settable material at one end of the barrel ahead of the ram, it is known to displace the ram with a controlled feed system and to inject the charge into a mold cavity at variable rates and pressures. During the fill portion of the ram stroke, ram speed or pressure may be modulated to control the rate at which the settable material flows into the mold. At the end of the fill portion of the stroke, it may be desirable to increase the ram packing pressure so that the material completely fills the mold cavity including any detailed impressions, and any pockets or voids caused by shrinkage of the material.

The pressure and speed modulation is controlled generally by means of the hydraulic system which operates a piston and cylinder assembly that displaces the ram. The pressure of the hydraulic fluid delivered to the piston and cylinder assembly may be regulated, and a change in such pressure provides a corresponding change in the pressure developed by the ram on the plasticized material in the mold.

It is also known to vary the feed rates of the ram by employing one or more pumps or fill valves in the hydraulic system that operates the ram. By increasing the flow through a multi-pump or valve system, a higher rate of ram displacement and correspondingly a shorter charging time is achieved. Naturally the use of multiple pumps or valves necessitates an associated control system to vary ram displacement. Changing the rate of ram displacement at an intermediate point in the charging stroke introduces an additional degree of complexity.

It is accordingly a general object of the present invention to provide a new and improved method and apparatus in an injection molding machine for controlling the speed or pressure at which the injection ram operates.

SUMMARY OF THE INVENTION

The present invention resides in an injection molding machine having a mold which defines a mold cavity charged with a settable material by means of a movable ram.

The ram is stroked or displaced during the mold charging operation by actuating means including a piston and cylinder assembly having an unbalanced piston. A first side of the unbalanced piston has a smaller effective pressure area than the second, opposite side generally due to a piston rod extending from the first side through the cylinder. The unbalanced piston is moved within the cylinder by means of a pressurized fluid, typically hydraulic fluid, that is introduced into the cylinder.

Fluid control means for directing pressurized fluid in and out of the cylinder and against the piston includes a regeneration valve that has fluid connections through the cylinder with both the first and the second sides of the piston. The valve is operable between a first, nonregenerative condition that effectively interrupts fluid communication between the two sides of the piston, and a second, regenerative condition that permits fluid communication between the two sides. Thus, when pressurized fluid is applied to the second side of the piston from, for example, a hydraulic pump, fluid at the first side of the piston is either discharged through the valve at low pressure to a reservoir or the fluid is regeneratively pressurized and delivered to the opposite side of the piston with other hydraulic fluid at an elevated pressure.

Accordingly, by selectively positioning the regeneration valve in one condition or another, the piston and cylinder assembly can be operated in either a regenerative or nonregenerative mode. For a given pressure and fluid flow rate, the piston and cylinder assembly develops a maximum ram pressure or force in the nonregenerative mode and a maximum rate of ram displacement in the regenerative mode. By changing the condition of the regeneration valve, the rate of displacement of the injection ram or the pressure developed by the ram can be changed correspondingly. The change may be made either during an injection stroke or between injection cycles. The regenerative control means avoids energy losses attributable to extra pumps that would operate in an idling mode during intervals when fluid flow demands are low. The regenerative control means also offers a practical alternative to increased pump capacities. For example, in many cases when higher fill rates are desired, the lower injection pressures and high flow capacity associated with regenerative feed are both adequate to fill the mold cavity at the increased rates after which the nonregenerative feed is used for high pressure packing. Accordingly, fluid control means incorporating a regeneration valve offers the versatility of multi-pump and valve systems or systems having multiple pressures and flow delivery capacities.

BRIEF DESCRIPTION OF THE DRAWINGS

The drawing illustrates an injection molding machine in schematic form with a fluid actuator for the injection ram and fluid controls for the actuator including a regeneration valve in accordance with the present invention.

DESCRIPTION OF THE PREFERRED EMBODIMENTS

The injection molding machine, generally designated 10 in the drawing, is a conventional machine to the extent that it employs a screw or injection ram 12 mounted within a heated barrel 14 that is connected at one end with a splittable injection mold 16. A loading hopper 18 is connected to the end of the barrel 14 opposite the mold and receives a thermosetting or other settable material in granular or pellet form. This material melts at elevated temperatures.

The hopper 18 dumps the granular material into the bore of the heated barrel at one end. The material is then pulled through the barrel toward the mold 16 by the ram, and a plurality of electrical or other heaters 22 surrounding the barrel cause the material to melt and assume a plasticized state suitable for injection into the mold cavity. To this end the ram is provided with helical lands 24 which fit in close relationship within the bore of the barrel, and the ram is connected through the fluid actuator 30 of a controlled feed system with a rotary drive motor 32 at the end of the machine opposite the mold 16. The actuator 30 is formed by a piston and cylinder assembly having a cylinder 34 and a movable piston 36. At the rear the piston 36 is rotatably coupled by splines to the drive shaft 38 of the motor 32 and at the forward end the piston is directly connected with the ram 12 to allow the motor 32 to rotate the ram and push a charge of plasticized material into the end of the barrel adjacent the mold 16.

A fluid control means described in greater detail below, including a fixed displacement hydraulic pump 40 is coupled to the actuator 30 to control the displacement of the piston 36 and correspondingly the injection ram 12 during the injection process. With a charge of plasticized material in front of the ram, the actuator 30 is energized by the fluid control means and displaces the ram toward the mold 16 to inject the material into the mold cavity 20.

As mentioned above, it is desirable in the injection molding machine to control the rate at which the ram is displaced and the pressures developed by the ram on the plasticized material as the material is injected and during the interval in which the the material is setting up. In accordance with the present invention the system which controls the feed rate of the ram actuator 30 is a pressurized fluid control means which is capable of both regenerative and nonregenerative operations.

The fluid control means illustrated in the drawing is comprised primarily of a timing control 50 and a hydraulic system including the fixed displacement pump 40 and a reservoir 52 from which the pump draws hydraulic fluid at low pressure and to which the pump discharges excess fluid through a pressure regulator or relief valve 48. A main flow control valve 54 connected between the actuator 30 and the pump 40 responds to the timing control 50 through solenoids 56 that displace the valve spool. As illustrated, the control valve 54 is a four-way valve that reverses the flow of hydraulic fluid to the actuator, and the valve has a floating center position that relieves actuating pressure at both sides of the piston 36. Of course, it is not essential that the control valve 54 be actuated by means of the electrical solenoids since hydraulic, pneumatic and even manual operation may be suitable under various circumstances.

The timing control 50 actuates the valve 54 at preselected times in the operating cycle of the molding machine 10. The control may receive additional information from the machine such as piston position or pressure signals to perform the control functions, and has an internal clock or timer to determine when specific operations and functions in the hydraulic system should occur.

The main control valve 54 is connected through a regenerative feed or regeneration valve 62 to the inlet port 58 of the cylinder 34 at one side of the piston 36. The port 58 is associated with the side of the piston having an effective pressure area smaller than the other side due to the attachment of the piston rod 64.

The control valve 54 is also connected with the port 60 associated with the other, large area side of the piston 36 through throttling devices that are effective during different phases of the actuator operation. For example, when the piston 36 is driving the ram 12 toward the mold 16 in an injection step, hydraulic fluid is directed from the valve 54 to the port 60 and into the cylinder 34 through a check valve 66 and a throttling orifice 68. The throttling orifice 68 can be adjusted to control the rate at which the piston and ram are displaced and correspondingly, the rate at which the mold cavity 20 is charged with the plasticized material.

An adjustable back pressure valve 70 is positioned in the fluid conduits between the port 60 and the control valve 54 in parallel with the throttling orifice 68 and the check valve 66, and is arranged to permit hydraulic fluid to flow from the cylinder 34 around the check valve 66 and back to the reservoir 52. However, the valve 70 develops a slight back pressure in the cylinder which resists the rearward displacement of the ram 12 as the ram is rotated and a new charge of plasticized material is moved toward the charging chamber at the front of the machine between the nonreturn valve 44 and the adjacent end of the barrel. The back pressure developed by the valve 70 is used to control the amount of mechanical work and/or mixing which is applied to the material as the material is plasticized and moved toward the charging chamber.

Normally adjustment of the throttling orifice 68 and the back pressure valve 70 remain fixed for particular molds and injection materials.

The regeneration valve 62 illustrated as a three-way valve is actuated by a solenoid 72 and in one position establishes fluid communication between the flow control valve 54 and the port 58, and in the other position establishes communication between the ports 58 and 60 by way of a conduit 74 and a check valve 76. In the latter case, the conduit 74 completes a regenerative feed circuit which means that hydraulic fluid pressurized by the small area side of the piston flows from the cylinder 34 at port 58 through the valve 62 and the conduit 74 back into the cylinder through the port 60 associated with the large area side of the piston.

The hydraulic system is activated in the regenerative mode by the regeneration valve 62 and the timing control 50 when the ram 12 is being driven toward the mold in an injection process by pressurized hydraulic fluid passing through the throttling orifice 68 from the main flow control valve 54. Assuming that the splines on the motor shaft 38 are fillet-root splines that allow hydraulic fluid to enter the splined bore in the piston 36, the full area of the side of the piston associated with the port 60 is available to pressurize the hydraulic fluid at the opposite side of the piston associated with the port 58. Accordingly, additional pressurized hydraulic fluid is generated when the regeneration valve 62 is moved to the regenerative position interconnecting the ports 58 and 60. Such hydraulic fluid joins the flow of hydraulic fluid through the throttling orifice 68 by means of the conduit 74 and thus provides an increased flow of fluid to the port 60 and a corresponding increase in the rate at which the ram 12 is displaced toward the mold 16. A commensurate decrease in the overall output force of the actuator 30 is experienced; however, it has been found that at least in certain injection molding machines, maximum output force is not needed during the entire injection step when the charge of plasticized material is being injected into the empty mold cavity 20.

The hydraulic system may be operated in the nonregenerative mode during the packing portion of the injection step after the cavity has been filled and higher packing pressures are needed. With the illustrated hydraulic system the higher packing pressure is developed by positioning the regeneration valve 62 in the nonregenerative position as shown to couple the hydraulic port 58 through the valve and the valve 54 with the reservoir 52. In the nonregenerative position therefore, the pressure on the small area side of the piston 36 is the reservoir or return pressure while the pressure on the large area side of the piston associated with the port 60 is the maximum output or regulated pressure of the pump 40. Accordingly, there is a maximum pressure differential across the piston 36 with the large area side of the piston being fully effective, and a maximum packing force and pressure is developed by the ram in the mold cavity 20.

A better understanding of the regenerative hydraulic system may be had from the description of an exemplary molding machine cycle.

At the beginning of the machine cycle the mold cavity 20 is empty and the ram 12 and piston 36 are in the position illustrated. The drive motor 32 is actuated to rotate the piston and ram so that a charge of plasticized material is advanced through the heated barrel 14 to a position ahead of the ram. At the same time the ram is displaced rearwardly in opposition to the back pressure developed in the cylinder 34 by the valve 70. During this time the flow control valve 54 is in the illustrated center position and the regeneration valve 62 is in its nonactuated, nonregenerative position as illustrated.

When a predetermined charge of material is ahead of the ram 12 as determined by ram position measurements or other charge measuring devices, the drive motor 32 is stopped, and the hydraulic system is actuated to displace ram 12 in the injection phase of the machine cycle. The spool of the flow control valve 54 is shifted to the left by the timing control 50 so that pressurized hydraulic fluid is delivered to the hydraulic port 60 through the throttling orifice 68. It will be assummed that a rapid displacement of the ram is desired during the initial portion of the ram stroke and, accordingly, the regenerative feed valve 62 is also actuated by the timing control 50 and placed in the regenerative position. Fluid communication then exists between the cylinder ports 58 and 60 and hydraulic fluid flows through the check valve 76 in conduit 74 to combine with the pressurized fluid from the pump 40 entering the cylinder 34 through the port 60.

A maximum rate of ram displacement is obtained under these circumstances to charge the mold cavity 20 in the shortest period of time. For example, with the sides of the piston 36 having a pressure area ratio of 2:1 it could be expected that the ram displacement time would be reduced up to one half by operating the hydraulic system regeneratively rather than nonregeneratively. In actual practice, it has been established that an even shorter injection time is obtained. The precise reason for the greater than expected reduction is not known; however, it is believed that the more rapid injection reduces the time for the plastic material to cool after it leaves the heated barrel 14 and, therefore, the material maintains a lower viscosity and flows into the mold 20 more easily.

As the mold cavity 20 fills and the ram 12 approaches the end of the injection stroke, the timing control 50 at the end of a measured time period deactuates the regeneration valve 62 and the valve immediately assumes the nonregenerative position illustrated. In this position the hydraulic port 58 of the cylinder 34 is connected to the reservoir 52 and the hydraulic port 60 is connected with the pump 40. The rate at which the ram is displaced decreases rapidly with a corresponding increase in the pressures and force levels at which the ram operates due to the nonregenerative feed. The high pressures are utilized to firmly pack the plasticized material in the mold. Accordingly, during the initial portion of the stroke the ram is displaced at high speed due to the regenerative hydraulic feed arrangement, and during the terminal portion of the stroke the ram packs the material at high force levels due to the nonregenerative operation of the hydraulic system.

After the plasticized material has been allowed to set in the mold 16 momentarily, the timing control 50 shifts the spool of the flow control valve 54 to the center position which relieves hydraulic pressure on both sides of the piston 36. The rotary drive motor 32 is then energized and rotates both the piston 36 and the screw or ram 12 to work a new charge of material through the barrel 14 to the charging chamber in front of the ram. At the same time the ram shifts backward against a slight back pressure from the piston 36 until a measured charge has been developed. The timing control 50 then shifts the control valve 54 briefly to the right to draw the ram slightly backward and relieve pressure on the plastic charge which would otherwise dribble from the front end of the barrel when the mold 16 and barrel 14 separate. Thereafter the mold 16 separates and a finished article is ejected by conventional knockout apparatus. The mold closes and the machine 10 is then in condition to begin another molding cycle.

While the novel actuating means for stroking the ram 12 has been described in one exemplary embodiment, it should be understood that numerous modifications and substitutions can be made without departing from the spirit of the invention. For example, a timing control is merely one means of actuating the regeneration valve 62 and the flow control valve 54. In other machines it may be appropriate to measure the ram displacement at various positions in its stroke and to actuate the valves accordingly. Similarly, pressure measurements of the hydraulic fluid or the plasticized material may be relied upon for signals to trigger valve operation. The regeneration valve 62 may be operated at various times during the injection stroke of the ram 12 to control ram speed or pressure and not merely near the terminal portion of the stroke as in the above description. Furthermore, the valve 62 may be selectively actuated simply to control the speed of the ram throughout the entire injection stroke and not merely between consecutive and uninterrupted or contiguous portions of the injection stroke. Conversely, the valve may be used as a pressure control for regulating the maximum pressure at which the ram operates during all or just a portion of the injection stroke. The valve adds a new degree of flexibility to an injection molding machine by permitting various speeds or pressures to be utilized without adding to the pump capacity of the machine. Accordingly, the present invention has been described in a preferred embodiment and by way of illustration rather than limitation.

I claim:

1. In an injection molding machine having a mold defining a mold cavity charged with a settable material by means of a movable ram, the improvement comprising: actuating means for stroking the ram including a piston and cylinder assembly connected with the ram and having an unbalanced piston movable in the assembly by means of pressurized fluid in the cylinder, a first side of the unbalanced piston having a smaller effective pressure area than the opposite, second side; and fluid control means for directing pressurized fluid in and out of the cylinder at each side of the unbalanced piston including a regeneration valve having fluid connections with the cylinder at the first and second sides of the piston and operable between a first condition effectively interrupting fluid communication between the two sides of the piston and a second condition permitting fluid communication between the two sides for selectively operating the unbalanced piston regeneratively.

2. In an injection molding machine, the improvement of claim 1 wherein the regeneration valve in the first condition provides fluid communication through the valve to relieve fluid pressure against the first, smaller side of the piston.

3. In an injection molding machine, the improvement of claim 1 wherein the fluid control means further includes a source of pressurized fluid and a flow control valve connected with the source of pressurized fluid and with the piston and cylinder assembly for directing pressurized fluid alternatively to the first side of the piston through the regeneration valve or to the second side of the piston.

4. In an injection molding machine, the improvement of claim 3 wherein the flow control valve is connected with the piston and cylinder assembly to direct pressurized fluid to the second, larger side of the piston independently of the regeneration valve.

5. In an injection molding machine, the improvement of claim 3 wherein the fluid control means includes a hydraulic pump as the source providing hydraulic fluid under pressure and a hydraulic reservoir; and the flow control valve is connected to both the hydraulic pump and the reservoir to control hydraulic flow to and from the piston and cylinder assembly.

6. In an injection molding machine, the improvement of claim 1 wherein the fluid control means includes timing means for switching the regeneration valve between the first and second conditions.

7. In an injection molding machine having a displaceable ram for injecting a settable material into a mold, the improvement comprising:
actuating means for displacing the ram during an injection operation and including an unbalanced piston within a cylinder and a piston rod extending from the small area side of the piston toward the displaceable ram; and
fluid feed means connected with the cylinder for reversibly controlling the flow of pressurized fluid to and from the cylinder and displacement of the piston and ram, and including a flow control valve and a regeneration valve, the flow control valve being in fluid communication through the cylinder with the one side of the piston opposite the small area side from which the piston rod extends toward the ram and also with the regeneration valve, the regeneration valve being in fluid communication with both sides of the piston through the cylinder and having a regenerative position permitting fluid flow from one side of the piston to the other, and a nonregenerative position inhibiting fluid flow from one side of the piston to the other and permitting fluid flow between the small area side of the piston and the flow control valve.

* * * * *